United States Patent [19]

Matsushita

[11] 4,137,765

[45] Feb. 6, 1979

[54] ELECTROMAGNETIC FLUID FLOWMETER INSENSITIVE TO FLOW VELOCITY DISTRIBUTION

[75] Inventor: Shigetada Matsushita, Kawasaki, Japan

[73] Assignee: Fuji Electric Co., Ltd., Kawasaki, Japan

[21] Appl. No.: 800,138

[22] Filed: May 24, 1977

[30] Foreign Application Priority Data

May 25, 1976 [JP] Japan .................................. 51-60304

[51] Int. Cl.$^2$ .............................................. G01F 1/58
[52] U.S. Cl. .............................................. 73/194 EM
[58] Field of Search .................................. 73/194 EM

[56] References Cited

U.S. PATENT DOCUMENTS 3,358,075  12/1967  Hunt .......................... 73/194 EM X

FOREIGN PATENT DOCUMENTS 1295223  11/1964  Fed. Rep. of Germany ..... 73/194 EM
1521859  3/1968  France .............................. 73/194 EM Primary Examiner—Charles A. Ruehl
Attorney, Agent, or Firm—Sughrue, Rothwell, Mion, Zinn and Macpeak

[57] ABSTRACT

An electromagnetic fluid flowmeter including two arc-shaped, circular segment electrical insulating bodies $B_1$, $B_2$ disposed vertically opposite each other on the internal periphery of a tubular conduit M, and a pair of horizontally opposed, convex electrodes $D_1$, $D_2$. The respective dimensional relationships of the electrodes and insulating bodies, and the flux pattern of the magnetic field within the conduit, are geometrically determined and configured such that voltage induced between the electrodes is always proportional to the fluid flow rate regardless of the flow velocity distribution within the conduit.

3 Claims, 6 Drawing Figures

ELECTROMAGNETIC FLUID FLOWMETER INSENSITIVE TO FLOW VELOCITY DISTRIBUTION

BACKGROUND OF THE INVENTION

This invention relates to an electromagnetic flowmeter capable of accurately measuring the flow rate of a fluid passing through a circular conduit regardless of the flow velocity distribution of the fluid.

In conventional electromagnetic flowmeters, efforts have been made to provide a uniform exciting field to improve the measurement accuracy. Such a uniform exciting field can only improve the measuring accuracy, however, when the flow velocity distribution of the fluid is symmetrical with respect to the center axis of the tube or conduit, and if the distribution is not symmetrical considerable error results even if the magnetic field is completely uniform.

Referring to FIG. 4, it is assumed that the Z axis represents the flow direction of a fluid to be measured passing through a conduit G, the Y axis represents the direction connecting electrodes $A_1$ and $A_2$, the X axis represents the direction along which an exciting magnetic field B is applied perpendicular to both the Y and Z axes, Vz represents the flow velocity at an arbitrary point L (x, y), and the conduit G is a cylindrical body having a radius of a and covered with insulating material on its inner surface. Since the exciting magnetic field can be regarded as constant over a minor length of the Z axis, the consideration can be restricted only to two dimensional changes with respect to the components Bx and By in the directions of the X and Y axes. The voltage e generated between the electrodes $A_1$ and $A_2$ is represented by the equation:

$$e = \frac{2}{a\pi} \int \int_F (W_y B_x V_z + W_x B_y V_z) \, dx\,dy \qquad (50),$$

where F is a cross-section of the conduit G including the electrodes $A_1$ and $A_2$, Vz is the flow rate at an arbitrary point L (x, y) in the electrode-containing cross-section F, and Wx and Wy are "weighted functions" which represent the contributions of the X and Y components to the unit electromotive force generated at the arbitrary point L (x, y) in the electrode-containing cross-section F, or to the output signal generated between the electrodes $A_1$ and $A_2$, and which are determined only by the geometrical structure of the conduit G and the electrodes $A_1$ and $A_2$ regardless of the magnetic field distribution and the flow velocity distribution. It is known from the studies of J. A. Shercliff that the Y-component Wy has a distribution as shown in FIG. 5.

Since the exciting magnetic field B in conventional electromagnetic flowmeters is uniform, and therefore the X-component Bx and the Y-component By are, theoretically, Bx = constant and By = 0, equation (50) may be rewritten as:

$$e = \frac{2Bx}{a\pi} \int \int_F W_y V_z \cdot dx\,dy \qquad (51)$$

Since the weighted function Wy in equation (51) has different values depending on cross-sectional position, as shown in FIG. 5, the output signal e includes errors unless the flow velocity distribution at each point L (s, y) within the conduit G is symmetrical with respect to the center axis Z. It can be confirmed by the transformation of equation (51) that if the distribution is symmetrical the effect of the weighted function is eliminated.

Based on the result of Shercliff's studies, it was proposed in DAS No. 1,295,223 to establish the magnetic field Bx for each point L (x, y) within the conduit cross-section in inverse proportion to the weighted function, as shown in equation (52), to thereby eliminate the adverse effects of the flow velocity distribution.

$$Bx = \frac{Bo}{Wy} \quad (Bo: \text{constant}) \qquad (52)$$

The theoretical basis of DAS No. 1,295,223 rests on the assumption that the electrodes $A_1$ and $A_2$ are infinitely small, that is, in the form of point electrodes. Since most flowmeter electrodes have a diameter of about 6–10 (mm) however, the theory represented by equation (52) is not always valid, and errors are produced in the output signal.

SUMMARY OF THE INVENTION

This invention has been made in view of the foregoing disadvantages, and it is an object thereof to provide an electromagnetic flowmeter capable of measuring a fluid flow rate with improved accuracy even if the fluid has an asymmetrical flow velocity distribution with respect to the center axis of the measuring conduit or tube.

According to this invention, the above object can be attained by the provision of a measuring tube, a pair of arc-shaped electrodes located horizontally opposite each other in the tube, and a pair of arc-shaped insulating bodies disposed in the tube between the electrodes, and by establishing a magnetic field whose flux density component in a given direction is a function of its position within a cross-section of the tube.

In a preferred embodiment of this invention where the measuring tube is a cylinder having a radius of a and a pair of electrodes are located on the X axis in an X–Y coordinate system, the configuration of the arc-shaped insulating bodies is represented by the equation:

$$Im \log \frac{z + a}{z - a} = \eta,$$

where $z = x + iy$ and $\eta$ is selected to have a certain value.

Similarly, the configuration of the pair of arc-shaped electrodes is represented by the equation:

$$Re \log \frac{z + a}{z - a} = \xi,$$

where $\xi$ is selected to have a certain value.

The specified direction of the magnetic flux density in the magnetic field corresponds to the direction of a line tangent to a circle represented by the equation:

$$Re \log \frac{z + a}{z - a} = \xi,$$

and the intensity of the component in the specified direction is selected so that it is proportional to the product $r_1 \times r_2$, where $r_1$ is the distance between the tangent point and the point (−a, 0) and $r_2$ is the distance between the tangent point and the point (+a, 0) on the X-Y coordinates.

DETAILED DESCRIPTION OF THE PREFERRED EMBODIMENT

The description below will be presented in the following order for a better understanding of the invention:

I. Configuration of Electrodes and Introduction of Curvilinear Coordinates Thereto
II. Linear Element and Surface Element in the Curvilinear Coordinates
III. Measuring Theory of the Invention
IV. A Preferred Structural Embodiment of the Invention

Figure 1:
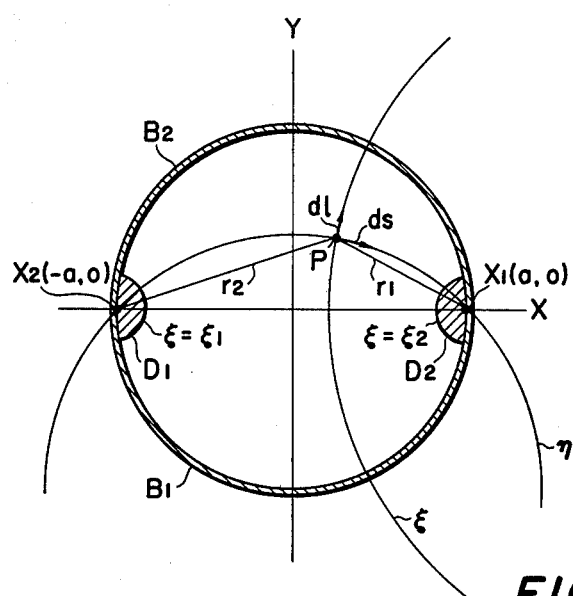
FIG. 1 and FIG. 2 show schematic, cross-sectional views for illustrating the basic concept of the invention.

I. Configuration of the Electrodes and Introduction of Curvilinear Coordinates Thereto FIG. 1 is a conceptional view illustrating the relationship between the configuration of a pair of electrode plates and the configuration of a pair of insulating bodies according to the invention. $B_1$ and $B_2$ denote a pair of insulating bodies whose inner surfaces are shaped in the form of an arc having a radius a. $D_1$ and $D_2$ denote a pair of electrodes electrically insulated from each other by the insulating bodies $B_1$ and $B_2$, and their inner surfaces are also arc shaped. The arc centers of the insulating layers are located at the origin (0, 0) and those of the electrodes are located on the X axis.

A description will now be given of the arc shapes of the inner surfaces of the electrode plates and the insulating bodies.

Figure 2:
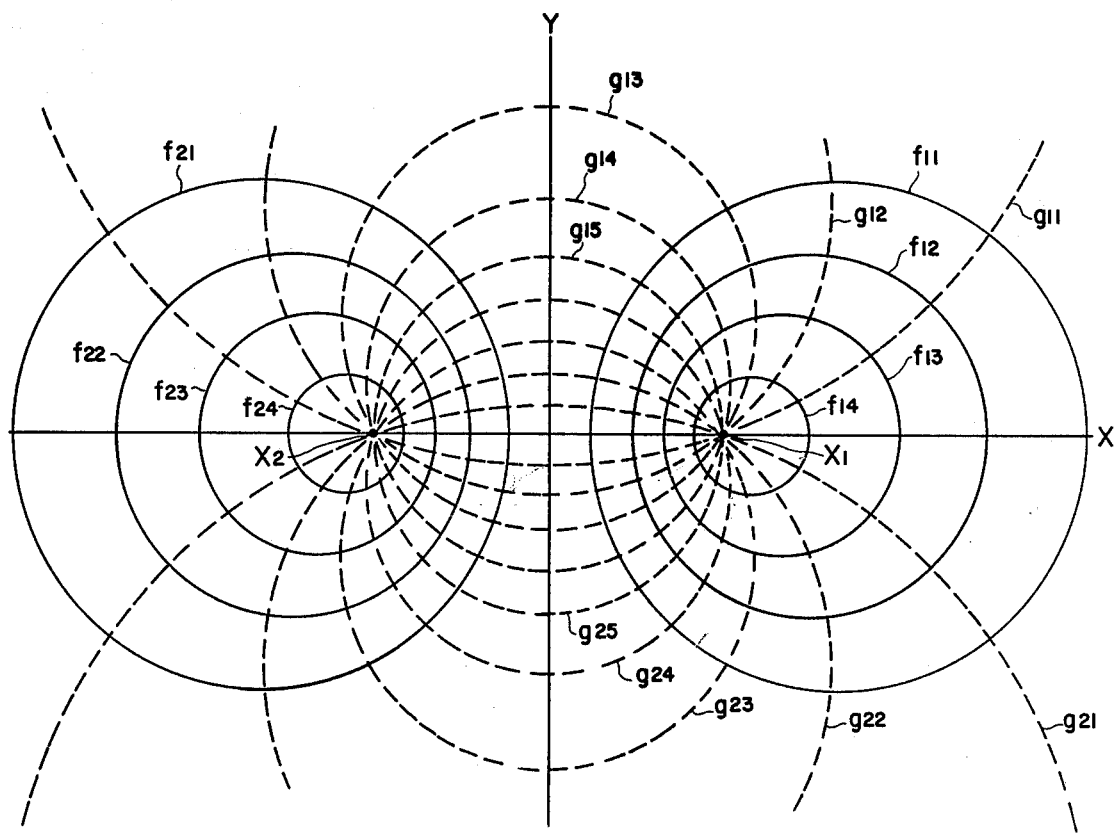
Figure 4:
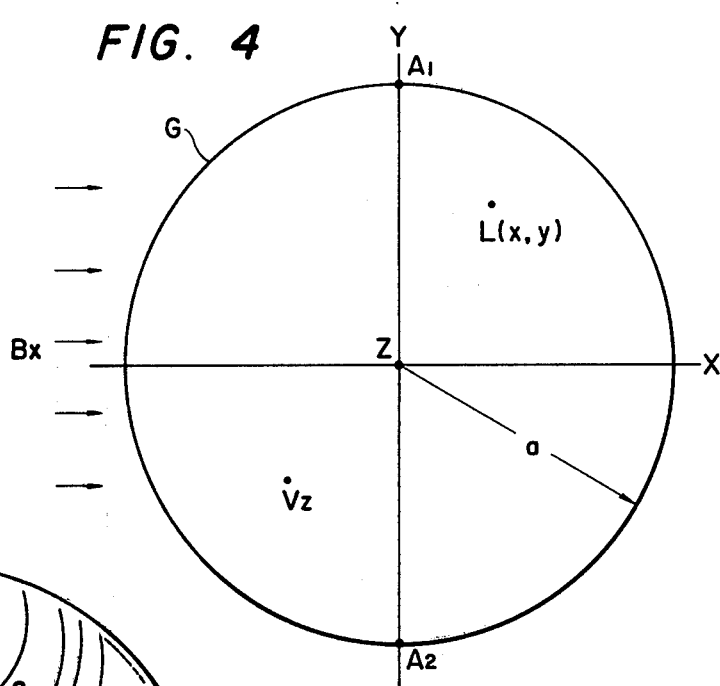
FIG. 4 and FIG. 5 show cross-sectional diagrams for illustrating the theory of measuring flow rate using an electromagnetic flowmeter.
Figure 5:
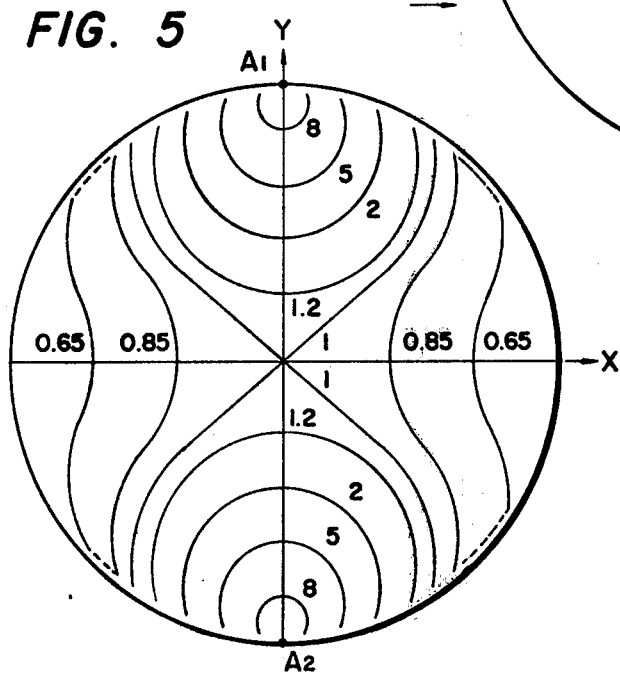

First, the X-Y coordinates of FIG. 1 are plotted in FIG. 2 and points $X_1$ (a, 0) and $X_2$ (−a, 0) are placed thereon. Contour mapping is then performed to represent the inner area of a circle having a radius a according to the curvilinear coordinates ($\xi$, $\eta$) given in equation (1):

$$f(z) = \log \frac{z + a}{z - a} = \xi + j\eta \quad (1),$$

wherein z is represented by equation (2) as:

$$z = x + jy \quad (2)$$

The above representation is divided into real and imaginary parts with respect to $\xi$ and $\eta$ as follows:

$$\xi = Re\left\{\log \frac{z + a}{z - a}\right\} = \frac{1}{2} \log \frac{(x + a)^2 + y^2}{(x - a)^2 + y^2} \quad (3)$$

$$\eta = Im\left\{\log \frac{z + a}{z - a}\right\} = \tan^{-1}\left(-\frac{2ay}{x^2 - a^2 + y^2}\right) \quad (4)$$

Equation (3) is transformed into equation (6) below based on equation (5) below. Taking $\xi$ as a parameter in equation (6), the locii represented by equation (6) forms a family of circles on a common axis each having a center on the X axis. The locus lies on the point $X_2$ (−a, 0) in FIG. 2 when $\xi$ equals − ∞ in equation (6), forms a family of circles whose radii increase as $\xi$ gradually increases from negative ∞ to zero, as shown by $f_{24}$, $f_{23}$, $f_{22}$ and $f_{21}$, and finally forms a circle of infinite radius coincident with the Y axis when $\xi$ becomes zero. As $\xi$ further increases in the positive direction in equation (5), the locus forms a family of circles whose radii decrease gradually as shown by $f_{11}$, $f_{12}$, $f_{13}$ and $f_{14}$, and finally lies on the point $X_1$ (a, 0) when $\xi$ equals + ∞.

$$\exp(2\xi) = \frac{(x + a)^2 + y^2}{(x - a)^2 + y^2} \quad (5)$$

$$y^2 + \left(x - a\frac{\exp(2\xi) + 1}{\exp(2\xi) - 1}\right)^2 = \left(\frac{2a}{\exp(2\xi) - 1}\right)^2 \times \exp(2\xi) \quad (6)$$

or $$y^2 + (x - x_o^2) = x_o^2 - a^2 \quad (6')$$

where $$x_o = a\frac{\exp(2\xi) + 1}{\exp(2\xi) - 1}$$

Equation (4) may be transformed into equation (7) as follows:

$$(y + \frac{a}{\tan \eta})^2 + x^2 = a^2(1 + \frac{1}{\tan^2 \eta}) \quad (7)$$

or $$(y + y_o)^2 + x^2 = a^2 + y_o^2 \quad (7')$$

where $$y_o = \frac{a}{\tan \eta}$$

Taking $\eta$ as a parameter in the equation (7), the locii represented by equation (7) forms a family of circles on a common axis each always including the points $X_1$ (a, 0) and $X_2$ (−a, 0) and having a center on the Y axis. That is, the locus forms a circle represented by $g_{25}$ having its center at the origin (0, 0) and a radius a when $\eta$ equals − $\pi/2$, forms a family of circles whose radii gradually increase as shown by circles $g_{14}$, $g_{13}$, $g_{12}$ and $g_{11}$ as $\eta$ increases from − $\pi/2$ to 0, coincides with the X axis when $\eta$ equals zero, forms a family of circles as shown by $g_{21}$, $g_{22}$, $g_{23}$ and $g_{24}$ when $\eta$ increases in the positive direction, and finally forms a circles represented by $g_{15}$ having a radius a and its center at the origin (0, 0) when $\eta$ equals $\pi/2$.

The arc of the inner surface of the electrode $D_1$ is represented by equation (6) where $\xi = \xi_1$, and the locus thereof is shown by the circle $f_{24}$. The arc of the inner surface of the electrode $D_2$ is represented by equation (6) where $\xi = \xi_2$, and the locus thereof is shown by the circle $f_{14}$. The arc of the inner surface of the insulating body $B_1$ is represented by equation (7) where $\eta = -\pi/2$, and the locus thereof is shown by the circle $g_{25}$. The arc of the inner surface of the insulating body $B_2$ is represented by equation (7) where $\eta = \pi/2$, and the locus thereof is shown by the circle $g_{15}$.

In the contour map of FIG. 2, each of the f family of circles orthogonally crosses each of the g family of circles.

II. Linear Element and Surface Element in the Curvilinear Coordinates

As shown in FIG. 1, it is assumed that a linear element is represented by a curve ds wherein $\eta$ is a constant, and another linear element is represented by a curve dl wherein $\xi$ is a constant. The linear element ds and dl are represented by equations (8) and (9) as follows:

$$ds = \frac{1}{h_1} d\xi \tag{8}$$

$$dl = \frac{1}{h_2} d\eta \tag{9}$$

wherein $h_1$ and $h_2$ are respectively represented by equations (10) and (11) as follows:

$$h_1 = \sqrt{(\frac{\delta\xi}{\delta x})^2 + (\frac{\delta\xi}{\delta y})^2} \tag{10}$$

$$h_2 = \sqrt{(\frac{\delta\eta}{\delta x})^2 + (\frac{\delta\eta}{\delta y})^2} \tag{11}$$

The surface element dN is represented by equation (12) as follows:

$$dN = ds\, dl = \frac{1}{h_1 h_2} d\xi d\eta \tag{12}$$

The Cauchy-Riemann differential equations (13) and (14) below apply to the regular complex function f(z):

$$\frac{\delta\xi}{\delta x} = \frac{\delta\eta}{\delta y} \tag{13}$$

$$\frac{\delta\xi}{\delta y} = -\frac{\delta\eta}{\delta x} \tag{14}$$

Equations (13) and (14) can thus be substituted into equations (10) and (11), respectively, to obtain:

$$h_1 = h_2 = \sqrt{(\frac{\delta\xi}{\delta x})^2 + (\frac{\delta\eta}{\delta x})^2} = h \tag{15}$$

Thus, $h_1$ and $h_2$ are the same, and may be represented simply by h.

The differential coefficient f'(z) for the regular function f(z) is as follows:

$$f'(z) = \frac{\delta\xi}{\delta x} + j\frac{\delta\eta}{\delta x} \tag{16}$$

Applying equation (16) to equation (1), h can be determined from equation (15) as follows:

$$h = |f'(z)| = \left|\frac{1}{z+a} - \frac{1}{z-a}\right| = \tag{17}$$

$$\frac{2a}{|z+a|\,|z-a|}$$

Assuming that the distances between points $X_1$ and $X_2$ and a point P (x, y) are $r_1$ and $r_2$, respectively, as shown in FIG. 1, equation (17) can be expressed as:

$$h = \frac{2a}{r_1 \cdot r_2} \tag{18}$$

III. Measuring Theory of the Invention

The theory of measurement of the invention will now be described with reference to the curvilinear coordinates ($\xi$, $\eta$) described above. The fundamental equation for an electromagnetic flowmeter is:

$$\vec{i} = \sigma(-\text{grad } U + \vec{V} \times \vec{B}) \tag{19},$$

where
- $\vec{i}$ is the current density,
- $\sigma$ is the conductivity of the fluid (assumed here to be a uniform value),
- U is the electrical potential,
- V is the flow velocity (assumed here to be only in the axial direction of the measuring tube), and
- B is the magnetic flux density.

It is assumed herein that there are no changes in the axial direction of the measuring tube, and the following discusseion will be made only with reference to the two dimensional changes in the X-Y plane. Taking only the ds component on the curvilinear coordinates into consideration, equation (19) is transformed into:

$$\frac{i_s}{\sigma} = -\frac{\delta U}{\delta l} + BlV \tag{20},$$

where
- is is the ds component of $\vec{i}$, and
- Bl is the dl component of $\vec{B}$.

Figure 3:
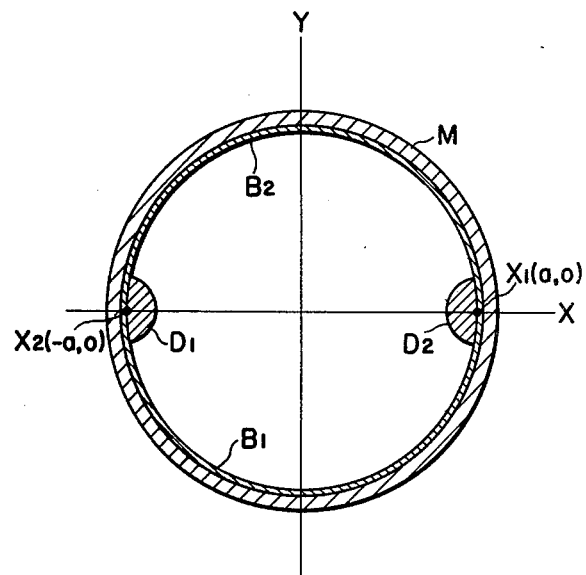
FIG. 3 shows a schematic diagram of the construction of a preferred embodiment of the invention.

If both sides of equation (20) are multiplied by 1/h and double integration is carried out for the area $$K\,(\xi_1 \leq \xi \leq \xi_3,\, -\frac{\pi}{2} \leq \eta \leq \frac{\pi}{2}),$$

the entire inside of the measuring tube in which fluid is present is represented, as shown in FIG. 3.

$$\int_{-\frac{\pi}{2}}^{\frac{\pi}{2}} \int_{\xi_1}^{\xi_2} \frac{i_s}{\sigma} \frac{1}{h} d\xi d\eta = \tag{21}$$

$$\int_{-\frac{\pi}{2}}^{\frac{\pi}{2}} \int_{\xi_1}^{\xi_2} (-\frac{\delta U}{\delta s}) \frac{1}{h} d\xi d\eta -$$

$$\int_{-\frac{\pi}{2}}^{\frac{\pi}{2}} \int_{\xi_1}^{\xi_2} V \frac{Bl}{h} d\xi d\eta$$

The basic operation is represented by the first term on the right side of equation (21), which, from equation (9), becomes:

$$\int_{\xi_1}^{\xi_2} \frac{\delta U}{\delta s} \frac{1}{h} d\xi = \int_{\xi_1}^{\xi_2} \frac{\delta U}{\delta s} ds = U\Big|_{\xi=\xi_1}^{\xi=\xi_2} = U_{21} \tag{22}$$

The voltage $U_{21}$ represented by equation (22) is a potential difference produced between the electrodes $D_2$ and $D_1$.

Similarly, the basic operation represented by the left side of equation (21) becomes, from equation (9):

$$\int_{-\frac{\pi}{2}}^{\frac{\pi}{2}} is\frac{d\eta}{h} = \int_{-\frac{\pi}{2}}^{\frac{\pi}{2}} is\, dl \quad (23)$$

The right side of equation (23) represents the sum of the current components perpendicular to a curve, where $\xi$ is constant. Assuming that no current escapes through the insulating bodies $B_1$ and $B_2$, and that a voltage detector having an extremely high input resistance is used whereby no substantial current flows between the electrodes $D_1$ and $D_2$, equation (23) can be rewritten as:

$$\int_{-\frac{\pi}{2}}^{\frac{\pi}{2}} is\frac{d\eta}{h} = 0 \quad (24)$$

When equations (22) and (24) are substituted into equation (21) and the latter is solved, the following equation is obtained:

$$\int_{-\frac{\pi}{2}}^{\frac{\pi}{2}} U_{21}\, d\eta = \int_{-\frac{\pi}{2}}^{\frac{\pi}{2}} \int_{\xi_1}^{\xi_2} v\frac{B1}{h} d\xi d\eta \quad (25)$$

If the magnetic flux density B1 is such that the dl component thereof is proportional to 1/h as shown in equation (26) below, then equation (25) may be transformed into equation (30) below in view of equation (12) concerning the surface element dN.

$$B1 = \frac{k}{h} = k\frac{r_1 \cdot r_2}{2a}, \text{ where } k \text{ is a proportional constant} \quad (26)$$

More specifically, the left side of equation (25) is first transformed into:

$$-\int_{-\frac{\pi}{2}}^{\frac{\pi}{2}} U_{21} d\eta = -\pi U_{21} = \pi U_{12}, \quad (27)$$

where $U_{12}$ is the potential difference between the electrodes $D_1$ and $D_2$ and $U_{12} = -U_{21}$. The right side of equation (25) is then transformed into:

$$\int_{-\frac{\pi}{2}}^{\frac{\pi}{2}} \int_{\xi_1}^{\xi_2} V\frac{B1}{h} d\xi\, d\eta = \quad (28)$$

$$\int_{-\frac{\pi}{2}}^{\frac{\pi}{2}} \int_{\xi_1}^{\xi_2} V\frac{1}{h^2} d\xi\, d\eta =$$

$$K\int_{-\frac{\pi}{2}}^{\frac{\pi}{2}} \int_{\xi_1}^{\xi_2} Vdsdl = KQ,$$

wherein Q is represented by:

$$Q = \int_{-\frac{\pi}{2}}^{\frac{\pi}{2}} \int_{\xi_1}^{\xi_2} Vdsdl \quad (29)$$

From the foregoing, equation (25) can thus be rewritten as:

$$U_{12} = \frac{k}{\pi} Q \quad (30)$$

As can be seen from equation (30), when the dl component of the magnetic flux density B1 at a point P is proportional to the product of the distance $r_1$ and $r_2$, and the potential between the electrodes $D_1$ and $D_2$ is sensed by a voltage detector having an extremely high input resistance, the output voltage $U_{12}$ is directly proportional to the fluid flow rate Q regardless of the flow velocity distribution.

IV. Preferred Embodiment of the Invention

Referring to the cross-sectional view shown in FIG. 3, arc-shaped electrodes $D_1$ and $D_2$ based on equation (3) and arc-shaped insulating bodies $B_1$ and $B_2$ based on equation (4) are disposed on the internal periphery of a measuring tube M. When the electrodes $D_1$ and $D_2$ are connected to a voltage detector (not shown) having an extremely high input resistance, a voltage $U_{12}$ is generated proportional to the fluid flow rate Q as shown by equation (30).

The thickness of the insulating bodies $B_1$ and $B_2$ has no substantial effect, and the distance from the center axis to the inner surfaces of the insulating bodies can be approximated as a for a measuring tube M having an inner radius of a.

Figure 6:
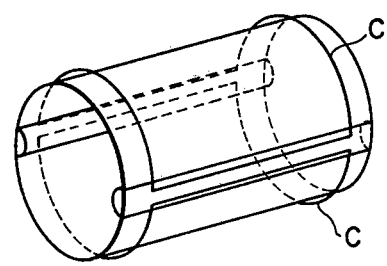
FIG. 6 shows a perspective view of appropriate magnetic field generating coils.

FIG. 6 shows a simplified perspective view of suitable coil configurations C for generating the magnetic field pattern shown in FIG. 2, such configurations being well known in the art.

What is claimed is:

1. An electromagnetic fluid flowmeter of the type comprising a pair of electrodes horizontally disposed opposite each other on the internal periphery of a tubular fluid conduit, means for establishing a magnetic field within the conduit the intensity of which in a given direction is a function of its position (x,y) in a cross-sectional plane of the conduit, and detecting means having a high input resistance connected to the electrodes for detecting the voltage generated therebetween as a conductive liquid flows through the conduit, the improvement comprising a pair of concave electrically insulating members vertically disposed opposite each other on the internal periphery of the conduit and individually interposed between the respective electrodes, the arcs of the inner surfaces of the insulating members being defined by the following equation:

$$(y+y_o)^2 + x^2 = a^2 + y_o^2$$

which is the equation of a first family of circles through two poles $(-a, 0)$ and $(a, 0)$ in the rectangular coordinate system superimposed on said cross-sectional plane of the conduit with the center of the conduit located at the origin of the rectangular coordinate system, and wherein said electrodes have a convex arc shape, the arcs of the outer surfaces of said electrodes being defined by the following equation:

$$y^2 + (x-x_o)^2 = x_o^2 - a^2$$

which is the equation of a second family of circles orthogonal to those of the first family, said two families of circles defining a bipolar coordinate system and $y_o$ and $x_o$ being predetermined constants for a given combination of insulating members and electrodes.

2. An electromagnetic flowmeter as defined in claim 1 wherein $y_o = o$ and the radius of said conduit is equal to a.

3. A fluid flowmeter as defined in claim 1, wherein the given direction of magnetic field intensity corresponds to a line tangent to a circle in said first of the families of circles defining the bipolar coordinate system and the field intensity in the given direction is proportional to the product $r_1 \cdot r_2$, where $r_1$ is the distance between the tangent point and the pole $(-a, 0)$ and $r_2$ is the distance between the tangent point and the pole $(a, 0)$.